United States Patent [19]

Doev et al.

[11] 4,438,443

[45] Mar. 20, 1984

[54] METHOD OF RECORDING INFORMATION ON A MEDIUM IN THE FORM OF ELECTRICAL SIGNALS

[75] Inventors: Vitaly S. Doev; Iosif M. Kotelyansky, both of Moscow; Valery B. Kravchenko, Fryazino; Yakov A. Monosov; Valery A. Shakhunov, both of Moscow; Jury L. Kopylov, Fryazino, all of U.S.S.R.

[73] Assignee: Institut Radiotekhniki I Elektroniki Akademii Nauk SSSR, U.S.S.R.

[21] Appl. No.: 314,079

[22] Filed: Oct. 13, 1981

[51] Int. Cl.$^3$ ...................... G01D 15/06; G01D 15/12
[52] U.S. Cl. .................................. 346/153.1; 346/74.4
[58] Field of Search .................... 346/74.3, 74.4, 74.2, 346/76 R, 76 PH, 76 C, 151, 153.1, 160; 219/216; 358/300, 301; 360/58, 59, 55; 430/269, 349

[56] References Cited

U.S. PATENT DOCUMENTS

| | | | |
|---|---|---|---|
| 3,171,106 | 2/1965 | Lemmond | 346/74.3 |
| 3,311,903 | 3/1967 | Lee, Jr. | 360/55 |
| 3,485,621 | 12/1969 | Kazan | 430/55 |
| 3,673,597 | 6/1972 | Horst et al. | 346/74.3 |
| 4,293,634 | 10/1981 | Monosov | 430/269 |

FOREIGN PATENT DOCUMENTS 1344601 1/1974 United Kingdom .
717706 2/1980 U.S.S.R. .

OTHER PUBLICATIONS

M. G. Arutyunov et al., "High-Speed Input-Output of Information" Moscow, 1970, (1977).
A. M. Balbbashov et al., "Controlled Transparencies Based on Magnetic Crystals", Kvantovaya Elektron (Moscow) 4, 1933–1943, (1977).

Primary Examiner—Thomas H. Tarcza
Attorney, Agent, or Firm—Steinberg & Raskin

[57] ABSTRACT

A method consisting in that a portion of the working layer is acted upon at first by a uniform thermal field and simultaneously or successively by a uniform vector field whose vector lines are perpendicular to the carried surface. At least one of the fields is obtained by converting the electrical signals transmitting the information being recorded. When recording on a carrier portion heated to a temperature higher that the softening temperature of the working layer binder (3), particles (4) are aligned along the vector lines whereby optical density of said area within the medium is changed according to the recorded information. The time is started to be fixed at the moment the vector field is no longer applied.

20 Claims, 1 Drawing Figure

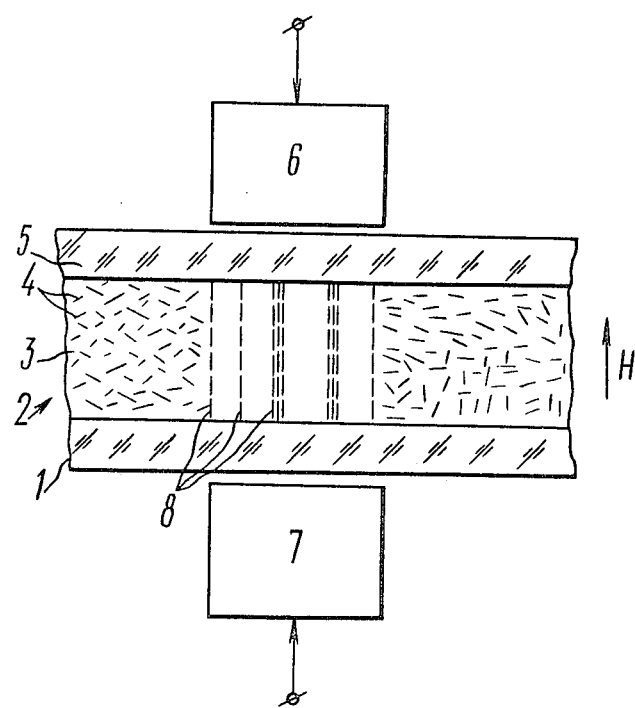

METHOD OF RECORDING INFORMATION ON A MEDIUM IN THE FORM OF ELECTRICAL SIGNALS

BACKGROUND OF THE INVENTION

The present invention relates to data processing and recording and in particular to a method of recording information on a medium in the form of electrical signals.

The use of the prior art methods of providing on a medium a visual presentation of data contained in electrical signals has been generally limited by insufficient speeds of recording information conveyed in the form of electrical signals, low packing density thereof, and absence of reusable media, i.e. media suitable for repeated utilization during recording, readout, and erasure cycles.

There is known a thermochemical method of recording information on a medium in the form of electrical signals. (M. G. Arutjunov, V. D. Markovich. Fast Input-Output of Information, published in 1970, Moscow, Energia Publ., p. 158). It consists in that electrical signals conveying information are converted into thermal signals which affect an information recording medium. With the aforesaid method, the recording medium comprises a paper substrate coated on one side with lead thiosulphate acting as a working layer and covered with a breaching titanium dioxide layer. A powdered aluminum layer is applied to the substrate on the other side.

Black lead sulphide PbS, gaseous sulphur, and sulphur dioxide $SO_2$ are formed as white lead thiosulphate $PbS_2O_3$ is chemically decomposed under the action of thermal signals. Optically nonhomogeneous patterns are thus produced within the working layer of the recording medium to represent the information conveyed in the form of electrical signals. The known method have been open to the objection that the recording of information on a medium is accompanied by the formation of noxious gaseous products, a disadvantage necessitating the use of ventilating facilities. Furthermore, the recording medium utilized in the aforesaid method may not be reused.

Another known method of obtaining and recording information in the form of electrical signals on a medium (A. M. Balbashov. Controlled Transparents on Magnetic Crystals, Kvantovaya Elektronika magazine, 1977, Moscow, vol. 4, No. 9, p. 1933) essentially consists in that a matrix composed of control electrodes is placed in extremely close proximity to a magnetic crystal utilized as a recording medium. The matrix is employed to convert electrical signals conveying the information into corresponding magnetic signals. Magnetic fields set up in the matrix elements under the action of the electrical signals change locally the domain structure of the magnetic crystal. Consequently, a latent image is formed within the magnetic crystal. Limitations inherent in the aforesaid method are the need to make visible the recorded latent image by the use of an additional constructionally intricate optical system comprising a light source, a polarizer, and an analyzer, and also the utilization of a comparatively expensive material (magnetic monocrystal) in the fabrication of the recording medium.

Also known in the art is a method of recording information on a medium in the form of electrical signals, which comprises such steps as application of a vector field and a uniform thermal field to an area within the working layer of the medium wherein the information is recorded, said uniform thermal field being used to heat said area to a temperature above the softening temperature of the binder working layer, in which particles capable of changing spatial attitude thereof in accordance with the recorded information due to a dipole moment are distributed in a uniform manner, the subsequent step being the cooling of said area within the working layer to a temperature below the softening temperature of the binder for fixing the recorded image (cf., for example, U.S. Pat. No. 3,311,903, class 340-174.1).

With such a method, the recording medium must have a constant thickness. The working layer of the medium includes a thermoplastic binder wherein magnetic particles are uniformly distributed. The medium is placed in the vicinity of an electrical-signal-to-magnetic-signal converter. The converter accepts electrical signals conveying information and converts them into magnetic signals affecting a chosen area within the working layer of the medium. In said area the medium particles are magnetized, i.e. the vectors of dipole magnetic moments thereof are oriented in accordance with the magnetic field of the signal being recorded. Following this, the medium is placed in the vicinity of a uniform thermal field source, and said area of its working layer is heated to a temperature above the softening temperature of the binder. As this happens, the viscosity of the binder is appreciably reduced to allow displacement of magnetic particles dispersed therein under the action of ponderomotive forces. The particles are thus grouped with the result that dense and thin formations appear in accordance with the magnetization thereof, induced by a magnetic signal. The thickness of the medium will then change locally, the subsequent step in the aforesaid method being the cooling of the medium for fixing the recorded latent image to a temperature below the softening temperature of the binder.

A disadvantage of the known method is that the recording medium may not be reused.

The aforesaid method has been unsatisfactory due to a complicated and labour-consuming process involved in making visible and reproducing a latent image by the use of a laser beam, utilization of constructionally intricate equipment, and stringent requirements for the thickness of recording media, which are generally limiting factors.

SUMMARY OF THE INVENTION

The invention resides in providing a method of recording information on a medium in the form of electrical signals, which allows obtaining a visible image of recorded information on a reversible medium with no limitations in uniformity of its thickness, by changing locally optical density of certain areas within a working layer of a recording medium due to the ability of working layer particles possessing a dipole moment to align within a softened binder along vector lines of an external vector field acting thereon.

The foregoing object is accomplished by that in a method of recording information on a medium in the form of electrical signals, comprising such steps as application of a vector field and a uniform thermal field to an area within a working layer of the medium wherein information is recorded, said uniform thermal field being used to heat said area to a temperature above the softening temperature of the working layer binder, in which particles capable of changing spatial attitude thereof in accordance with the recorded information due to the presence of a dipole moment are uniformly distributed, and cooling of said area of the working layer to a temperature below the softening temperature of the binder for fixing the recorded image, according to the invention, the chosen area within the working layer of the recording medium is first affected by the thermal field and simultaneously or subsequently by the vector field, at least one of the fields being produced by converting electrical signals conveying information to be recorded, the vector field representing a uniform magnetic or electric field whose vector lines are normal to the surface of the recording medium, said field being used to align particles of the working layer of the medium in the area heated above the softening temperature of the binder along the vector lines, whereby optical density of said area within the medium is changed according to the recorded information, the fixing of the image being started after the application of the field or fields effecting the recording is stopped.

Preferably, the uniform thermal field is produced by converting electrical signals conveying information and used for recording the information, the uniform magnetic or electric field being held constant throughout the procedure.

It is of advantage that the uniform magnetic or electric field is obtained by converting electrical signals conveying information and used for recording the information, the uniform thermal field being held constant throughout the procedure.

Desirably, the uniform magnetic or electric field and the uniform thermal field are set up by converting electrical signals conveying information and utilized for effecting the information recording.

The hereinproposed method of recording information on a medium in the form of electrical signals allows obtaining and recording on a medium a visible presentation of information in the form of local variations of optical density of areas within the medium. Such local variations of optical density of areas within the medium are produced under the effect of a uniform vector field whose vector lines are normal to the surface of the medium, in areas heated to a temperature above the softening temperature of the binder due to alignment of the particles possessing a dipole moment along the vector lines of the field, i.e. normal to the surface of the medium.

Information conveyed in the form of electrical signals is converted into respective changes of the vector or thermal field, images having different intensities being preferably recorded by converting the electrical signals conveying the information into intensity and/or duration changes of the vector and thermal fields simultaneously.

The recording method forming the subject of the present invention permits attaining a visual presentation of information conveyed in the form of electrical signals on a reversible medium, i.e. a medium suitable for reuse during such cycles as recording, readout, and erasure of a visible image. The requirements for the thickness of the medium become less stringent: it should not necessarily have a predetermined thickness. The hereinproposed method entails a simple production procedure and does not call for the utilization of costly and constructionally intricate equipment. It allows recording information in the form of electrical signals with different intensity. Stated differently, images may be obtained within the "gray" scale, this advantage being due to the fact that optical density of the working layer of the medium changes to a varying degree depending on the amplitude and duration of the converted electrical signal conveying the information. Advantages of the hereinproposed method over the prior art are a faster response and an enhanced packing density.

BRIEF DESCRIPTION OF THE DRAWING

The invention will now be described further with reference to specific embodiments thereof, taken in conjunction with the accompanying drawing which is a sectional view of a medium for recording information conveyed in the form of electrical signals, which is placed in the vicinity of a uniform vector field source and a uniform thermal heat source according to the invention.

DETAILED DESCRIPTION OF PREFERRED EMBODIMENTS

The hereinproposed method for recording information on a medium in the form of electrical signals may be executed using any known recording medium suitable for the purpose. Turning now to the drawing, the recording medium includes a substrate 1 topped with a working layer 2. The working layer 2 represents a heterogeneous medium composed of a binder 3 and a filler made up of solid 1 to 20 micron particles 4 evenly distributed throughout said layer and possessing a dipole moment, said binder and filler having different optical densities. The particles may be formed by suitable magnetic or ferroelectric materials.

In a preferred embodiment of the invention the particles 4 are needle-shaped. Each particle 4 of the recording medium may also be enclosed into a thin coat (not shown in the drawing). In the latter case, a magnetic particle representing a magnetic dipole is enclosed into a coat of nonmagnetic material, while a ferroelectric particle representing an electric dipole is enclosed into a coat of dielectric material possessing dipole or ionic polarizability. In any of the aforementioned recording media, the binder particles have a concentration of 5 to 35 per cent by volume.

The binder 3 of the recording medium is fabricated from materials of changing viscosity with temperature variations. It is generally wise to use a polymer with viscosity changing gradually with temperature variations or a crystal substance whose viscosity is abruptly altered due to aggregate transition (melting). The binder 3 may represent various thermoplastic materials, resins, waxes, paraffins, or stearin. In another embodiment of the invention, the working layer 2 represents individual cells (not shown in the drawing) whose lateral dimensions are commensurate with the thickness of the working layer and are within the resolution of the human eye (50 to 60 microns). The distance between the cells does not exceed 30 microns.

The working layer 2 is topped with an optically transparent protective layer 5.

The hereinproposed method of recording information on a medium in the form of electrical signals consists in that said medium is placed in the vicinity of a uniform vector field source 6 whose vector lines are normal to the surface of the medium, and of a uniform thermal field source 7. The thermal field is used to heat a chosen area of the working layer 2 of the recording medium to a temperature above the softening temperature of the binder 3.

To form in an area or areas of the working layer 2 of the medium, optically nonhomogeneous patterns providing a visible presentation of information conveyed in the form of electrical signals, the given area or areas of the working layer 2 of the medium will be affected first with a thermal field and simultaneously or subsequently with a vector field. At least one of the fields is obtained by converting electrical signals conveying the information to be recorded. This is done by applying the electrical signals to one of said sources (6 or 7) whereby the operation of the sources 6 and 7 will be controlled in accordance with the recorded information. Stated differently, at least the thermal field of the uniform thermal field source 7 or the vector field of the uniform vector field source 6 will be changed in accordance with the information being conveyed. Applying the uniform thermal field to the given area of the working layer, 2 heats it to a temperature above the softening or melting temperature of the binder 3. The uniform vector field of the source 6, whose vector lines are normal to the surface of the medium, is applied simultaneously or subsequently over a time period at which the temperature of the heated area of the working layer 2 remains higher than the softening temperature of the binder 3. The viscosity of the binder 3 in the heated areas of the working layer 2 is reduced to a value sufficient to cause the particles 4 dispersed therein, and possessing a dipole moment, to align under the action of the uniform vector field of the source 6 along the vector lines of the field, thereby forming single threads 8 or groups of threads 8 positioned at right angles to the surface of the medium. The optical density in said area of the working layer 2 of the medium will thus change in the direction normal to the surface of the medium.

The areas of the working layer 2 of the medium, which have not been jointly affected by the thermal and vector fields, will not change in optical density.

Thereafter, the working layer 2 of the medium, carrying a visible presentation of information conveyed in the form of electrical signals, is cooled below the softening (melting) temperature of the binder 3. The viscosity of the binder 3 is increased, and the fixing of the recorded image is started after the application of the field or fields effecting the data recording is stopped.

Inasmuch as the electrical signals conveying information may be applied to any of said sources (6 or 7), it is possible for a uniform thermal field to be produced by converting the electrical signals conveying the information, said field being used for information recording. The vector field may represent a stationary uniform magnetic or electric field.

In a structure wherein the particles 4 of the working layer 2 of the medium are fabricated from a magnetic material and act as magnetic dipoles, use is made of a uniform magnetic field source. If the particles 4 of the working layer 2 represent a ferroelectric material acting as electric dipoles, a uniform electric field source will be utilized. The uniform thermal field source 7 represents the known electrical-signal-to-thermal-signal converter which receives electrical signals conveying information. The electrical-signal-to-thermal-signal converter may represent a point converter, or a line converter composed of a plurality of point converters disposed along a line, or a plane converter made up of point converters arranged within a matrix (cf. M. G. Arutjunov and V. D. Markovich "High-Speed Data Input-/Output", "Energy" publishers, Moscow, 1970, p. 179).

In still another embodiment of the invention, the uniform vector field represents a uniform magnetic or electric field set up by converting electrical signals conveying information, said field being used for information recording. In this case, the thermal field source 7 represents a stationary uniform thermal field source, while the uniform vector field source 6 represents an electrical signal-to-magnetic-field converter if the particles 4 of the working layer 2 are made of magnetic materials, or an electrical-signal-to-electric-field converter if the particles 4 are made of ferroelectric substance. Such a converter sets up a uniform magnetic or electric field under the action of the electrical signals conveying information, the vector lines of said field being normal to the surface of the medium, said field being used to affect the heated areas of the working layer 2 of the medium and record the transmitted information. The electrical-signal-to-magnetic-field or electrical-signal-to-electric-field converter also represents a point converter, or a line converter, or a plane converter (cf. M. G. Arutjunov and V. D. Markovich "High-Speed Data Input/Output", "Energy" publishers, Moscow, 1970, p. 180).

In a third embodiment of the invention the vector field represents a uniform magnetic or electric field which is produced by converting electrical signals conveying information, whereas the uniform thermal field is a field which is also obtained by converting electrical signals conveying information, i.e. the information is recorded both by the use of the vector and thermal fields.

In this case, the uniform thermal field source 7 is an electrical-signal-to-thermal-signal converter accepting electrical signals conveying information, whereas the vector field source 6 is an electrical-signal-to-magnetic-field converter if the particles 4 of the working layer 2 of the medium are made of a magnetic material, or an electrical-signal-to-electric-field converter if the particles 4 of the working layer are made of a ferroelectric material said converter being also supplied with electrical signals conveying information.

The recording method in compliance with the present invention utilizes a reversible medium allowing repeated recording, readout, and erasure of a visible image. The erasing and preparation of the medium for subsequent data recording are accomplished by heating the working layer 2 of the medium above the softening (melting) temperature of the binder 3 and by mixing the particles 4 until they are evenly distributed within the binder 3, say, by ultrasound or a curl vector field whose intensity vector is parallel to the medium plane. Thereafter the working layer 2 is cooled below the softening temperature of the binder 3.

Examples given below illustrate specific embodiments of the hereinproposed method for recording information on a medium in the form of electrical signals.

EXAMPLE 1

Consider a medium comprising the substrate 1 made of a $60\mu$ thick polyethylene terephthalate film is used for providing a visual presentation of information conveyed in the form of electrical signals during an output operation in the computer installation. On one side of the substrate there are cells some $30\mu$ deep, whose lateral dimensions are $50 \times 50\mu^2$. The cells are separated from one another by walls 10 to $15\mu$ thick. Said cells accommodate the working layer 2 containing the polytrimethylenepimelate binder 3 with a softening temperature of 60° C. and the needle-shaped 2 to 5μ particles 4 fabricated from Permalloy and having a concentration of 20 percent by volume said particles being dispersed in said binder. The 20μ thick protective layer 5 is made of cellulose triacetate.

A permanent magnet acts as the uniform vector field source 6. The recording medium is placed in the 100 Oe uniform magnetic field of the permanent magnet so that the vector lines of said magnetic field are normal to the surface of the medium. The uniform thermal field source 7 representing an electrical-signal-to-thermal-signal converter is then installed in the vicinity of the recording medium. Thereafter said converter is supplied with discrete electrical signals conveying information. In a preferred embodiment of the device suitable for executing the proposed method a working member of said converter represents a silicon plate some 300μ thick, whose working surface measures 2×2.5 mm² (cf. "Electronics". USA, V. 42, No. 10, May 12, 1967, p. 64). Said silicon plate is secured to a much larger thermally conductive aluminum plate which presses said silicon plate to the recording medium. The working surface of the silicon plate accommodates 25 elements (point converters) in a matrix measuring 5×5 mm. Each element is a silicon mesa structure with a diffusion resistor disposed in the upper portion of the structure and a conductor connecting the mesa structure to a contact surface on the edge of the plate. The electrical signals coming to the input of the converter are processed by an electronic decoder. The converters corresponding to each specific information symbol are selected from among the 25 elements. Current is then passed through the selected elements to a silicon base acting as a common electrode for all the elements.

The matrix element passing current for $(5-15)\cdot 10^{-3}$ s heats to 80° to 85° C. the area of the working layer 2 of the medium being in thermal contact therewith whereby the viscosity of the polytrimethylenepimelate binder 3 will be substantially reduced in said area. The particles 4 of the thread 8 are aligned along the vector lines of the magnetic field normal to the surface of the medium under the action of ponderomotive forces of the uniform magnetic field of the permanent magnet. Consequently, the optical density of said area of the working layer 2 is appreciably reduced in the direction of normal to the plane of the recording medium. After the application of the thermal field is stopped, the heated area of the working layer 2 with the written symbol is cooled to a temperature below 60° C., which is softening temperature of the binder material (polytrimethylpimelate). The recorded image is thus fixed. The symbol writting time is 20 to 30 ms.

EXAMPLE 2

Perform operations similar to those described in Example 1. Information is recorded on a medium wherein the particles 4 of the working layer 2 are made of a ferrielectric material (barium titanate) possessing an electric dipole moment.

In the known device for executing the proposed method, the uniform vector field source 6 represents a stationary uniform electric field source. The vector lines of said field are normal to the surface of the medium and its intensity is $3\cdot 10^3$ V/cm.

EXAMPLE 3

Perform operations similar to those described in Example 1. Information is recorded on a medium wherein the binder 3 of the working layer 2 is made of a crystal material (tristearin) capable of reversibly and abruptly changing its viscosity due to aggregate conversion (melting), the melting temperature of said material being 72° C. The working layer 2 of the medium is heated to 73° C. by an elemeent of the matrix of the working member of the electrical-signal-to-thermal-signal converter disclosed in Example 1.

Example 4

Perform operations similar to those described in Example 1. Information is recorded on a medium comprising the substrate 1 made of a rough material (white paper) whose dispersion indicatrix is close to a circular curve for visible light.

EXAMPLE 5

The proposed method is executed in much the same manner as in Example 1.

Information is recorded on a medium comprising the binder described in Example 3. Information is recorded by the use of a thermal field. The uniform thermal field source 6 represents an electrical-signal-to-thermal-signal point converter. In said converter a working member is a silicon plate some 0.3 mm thick with an area of $0.1\times 0.1$ mm², a mesa structure with a diffusion resistor being provided on the surface of said plate. The point converter is fed with discrete or CW electrical signals conveying information, which are respectively converted into discrete or CW thermal signals corresponding to the transmitted information. The given area of the working layer 2 of the medium is then locally affected by the thermal signals. The information conveyed in the form of electrical signals is recorded on the medium in the "gray" scale due to the locally changing optical clearness in the given area of the working layer 2 of the medium, said change being brought about by predetermined variations of the amplitude and duration of the electrical signal conveying the information. The amount of "joule" heat liberated at the diffusion resistor changes within specified limits. Hence, the depth of the working layer 2 wherein the crystal binder 3 melts also changes. The number of the particles 4 aligned along the vector lines changes. Stated differently, the degree of optical clearness of said area of the working layer 2 of the medium is varied. Changing the amplitude of the electrical signal from $10^{-2}$ A to $2\cdot 10^{-2}$ A and its duration from $5\cdot 10^{-3}$ s to $2\cdot 10^{-2}$ s causes the optical density of the working layer 2 of the medium to vary by 1.2 to 0.8 units.

EXAMPLE 6

Perform the operations described in Example 5. In the device for executing the preferred embodiment of the invention the uniform heating source 7 represents an electrical-signal-to-signal-to-thermal-signal plane converter composed of a matrix incorporating electrical-signal-to-thermal-signal point converters. This combines the matrix addressing method with the "gray" scale data presentation.

EXAMPLE 7

Perform operations similar to those described in Examples 1 through 6. To enhance the sensitivity of the given area of the working layer 2 of the medium, said area is preliminary heated by the use of an additional heating source (not shown in the drawing) to a temperature somewhat lower than the softening of melting temperature of the binder 3. Thereafter said area is affected by the thermal field produced by converting the electrical signals conveying the information.

EXAMPLE 8

The proposed method of recording information on a medium in the form of electrical signals consists in that the medium disclosed in Example 1 is placed between the vector field source 6 and the uniform thermal field source 7, the working member thereof including a 0.2 mm thick, 0.25 mm wide, and 3 cm long nichrome plate, said plate being 1 cm wider than the recording medium. The vector field source 6 represents a line converter converting electrical signals conveying information into magnetic signals, said converter comprising a plurality of point magnetic heads disposed in a single plane along a line and producing local magnetic fields on application of electrical current, the vector lines of said fields being normal to the surface of the medium. Following this, the uniform thermal field source 7 is turned on and a current of 1 A is passed through the nichrome plate. The area of the working layer 2 of the medium, the length of which is equal to the width of the medium and whose width (0.25 mm) is approximately equal to the width of the nichrome plate, is heated to 75° to 85° C. (the temperature above the softening temperature of the binder 3 of the working layer 2 of the medium). Thereafter, the discrete electrical signals conveying information are fed to the electrical-signal-to-magnetic-signal converter, whence they are converted into local uniform magnetic fields with an intensity of 50 to 150 Oe. The intensity and duration of the converted magnetic signal correspond to the amplitude and duration of the electrical signal pulse conveying the information. The magnetic fields are then applied to separate heated areas within the working layer 2 of the medium. As a result, the optical density of said areas varies due to the changing spatial attitude of the magnetic particles 4 which are aligned within the binder along the vector lines of the field. After the application of the magnetic field is stopped, the given heated area of the working layer 2 of the medium is cooled to a temperature below 60° C., which is the softening temperature of the binder 3. The given area of the working layer 2 is cooled by turning off the source 7 or by removing said area from the heating zone. The symbol writing time amounts to tens of milliseconds.

EXAMPLE 9

Perform the operations described in Example 8. Information is recorded on a medium wherein the particles 4 are made of a ferroelectric material (barium titanate) possessing an electric dipole moment. The uniform vector field source 6 represents a converter converting electrical signals into uniform electric fields with an intensity of $(2-4) \cdot 10^3$ V/cm.

EXAMPLE 10

Perform the operations described in Examples 8 and 9. The uniform heating source 7 represents an optical radiation source (ruby laser) with a wavelength $\lambda = 0.63\mu$. Said radiation is effectively absorbed by the working layer 2 of the medium. Thus, the medium is heated to 80° C., which is higher than the softening temperature of the binder 3.

EXAMPLE 11

Perform the operations to those described in Example 1. The vector field source 6 represents a converter converting electrical signals into magnetic signals with an intensity of 50 to 200 Oe. The vector lines of the source 6 are normal to the surface of the medium. The electrical signals conveying information are simultaneously applied to the source 7 (electrical-signal-to-thermal-signal converter) and to the source 6 (electrical-signal-to-magnetic-signal converter). The obtained thermal and magnetic signals are simultaneously applied to the working layer 2 of the medium. A high-contrast visible image may thus be formed.

INDUSTRIAL APPLICABILITY

Information conveyed in the form of electrical signals is recorded on a medium primarily to enable its input and output in computer processing operations, and its recording in punching equipment and teletype systems on telegraph data transmission lines.

We claim:

1. A method of recording of information on a medium in the form of discrete electrical signals, comprising the steps of:
    forming a working layer of said medium by substantially uniformly dispersing particles having a dipole moment in a thermoplastic binder, said particles adapted to alter in special orientation in a softened state due to said dipole moment,
    applying a substantially uniform thermal field to at least a portion of said layer, to heat said portion above the softening temperature of the binder,
    after ceasing application of said thermal field, applying a vector field to said portion of said layer with vector lines of said vector field being oriented substantially perpendicular to the surface of said working layer and said vector field being applied until the individual particles of said portion are substantially aligned along the vector lines, resulting in a change of optical density of said portion of said layer,
    at least one of said thermal and vector fields being generated by converting the discrete electrical signals conveying the information to be recorded, and
    after ceasing application of said vector field, cooling said portion to a temperature below the softening temperature of said binder, to fix the information being recorded.

2. A method of recording of information on a medium in the form of discrete electrical signals, comprising the steps of:
    forming a working layer of said medium by substantially uniformly dispersing particles having a dipole moment in a thermoplastic binder, said particles adapted to alter in spacial orientation in a softened state due to said dipole moment,
    simultaneously applying a substantially uniform thermal field to at least a portion of said layer to heat said portion above the softening temperature of the binder, and a vector field to said portion with vector lines of said vector field being oriented substantially perpendicular to the surface of said working layer,
    at least one of said thermal and vector fields being applied until the individual particles are substantially aligned along the vector lines, resulting in a change of optical density of said portion of said layer, and after ceasing application of both said thermal and vector fields, cooling said portion to a temperature below the softening temperature of said binder, to fix the information being recorded.

3. The method of claim 1 in which said thermal field is generated by converting the discrete electrical signals conveying the information to be recorded.

4. The method of claim 1 in which the vector field is generated by converting the discrete electrical signals conveying the information to be recorded.

5. The method of claim 1 in which both said thermal and vector fields are produced by converting the discrete electrical signal conveying the information to be recorded.

6. The method of claim 2 in which said thermal field is generated by converting the discrete electrical signals conveying the information to be recorded, with the vector field being maintained substantially constant during application.

7. The method of claim 2 in which the vector field is generated by converting the discrete electrical signals conveying the information to be recorded, with said thermal field being maintained substantially constant during application.

8. The method of claim 2 in which both said thermal and vector fields are produced by converting the discrete electrical signals conveying the information to be recorded.

9. The method of claim 6 in which
said vector field is a magnetic field,
the working layer comprises a polytrimethylenepimelate binder in which substantially needle shaped, 2–5 micron size Permalloy particles are dispersed, and
the thermal field is generated by an electrical-signal-to-thermal-signal converter.

10. The method of claim 6 in which said vector field is an electric field,
the working layer comprises a polytrimethylenepimelate binder in which barium titanate particles are dispersed, and
the thermal field is generated by an electrical-signal-to-thermal-signal converter.

11. The method of claim 6 in which
said vector field is a magnetic field,
said working layer comprises tristearin, and
said thermal field is generated by an electrical-signal-to-thermal-signal converter.

12. The method of claim 6 which comprises the additional step of pre-heating the working layer to a temperature below the softening point of the binder, before applying the fields.

13. The method of claim 4 in which
the vector field is generated by an electrical-signal-to-magnetic-signal converter, and
the working layer comprises a polytrimethylenepimelate binder in which substantially needle shaped, 2–5 micron size Permalloy particles are dispersed.

14. The method of claim 4 in which the vector field is generated by an electrical-signal-to-magnetic-signal converter, and
the working layer comprises a polytrimethylenepimelate binder in which barium titanate particles are dispersed.

15. The method of claim 4 in which
the vector field is generated by an electrical-signal-to-magnetic signal converter,
the working layer comprises a polytrimethylenepimelate binder in which barium titanate particles are dispersed, and
said thermal field is generated by an optical radiation source.

16. The method of claim 8 in which
the working layer comprises a polytrimethylenepimelate binder in which substantially needle-shaped, 2–5 micron size Permalloy particles are dispersed,
said vector field is generated by an electrical-signal-to-magnetic signal converter, and
said thermal field is generated by an electrical-signal-to-thermal signal converter.

17. The method of claim 1 comprising the additional step of erasing said fixed information from said working layer by subsequent heating above the softening point of the binder and by mixing said particles until they are substantially uniformly distributed throughout the binder.

18. The method of claim 2 comprising the additional step of erasing said fixed information from said working layer by subsequent heating above the softening point of the binder and by mixing said particles until they are substantially uniformly distrubuted throughout the binder.

19. The method of claim 1 in which said working layer comprises binder and particles of different optical densities, said particles formed of at least one of magnetic and ferroelectric material.

20. The method of claim 2 in which said working layer comprises binder and particles of different optical densities, said particles formed of at least one of magnetic and ferroelectric material.

* * * * *